US005710544A

United States Patent [19]

Choi

[11] Patent Number: 5,710,544

[45] Date of Patent: Jan. 20, 1998

[54] OPERATION STATE DISPLAY APPARATUS FOR SHUTTLE SWITCH AND DISPLAYING METHOD THEREOF

[75] Inventor: Seog Gweon Choi, Kyungsangbook-Do, Rep. of Korea

[73] Assignee: LG Electronics Inc., Rep. of Korea

[21] Appl. No.: 565,549

[22] Filed: Nov. 30, 1995

[30] Foreign Application Priority Data

Nov. 30, 1994 [KR] Rep. of Korea .................. 31930/1994

[51] Int. Cl.[6] .................................................. H04Q 1/00

[52] U.S. Cl. ................................ 340/825.22; 340/825.36; 348/734

[58] Field of Search .................................... 345/156, 159, 345/164; 348/734; 340/825.36, 825.17, 825.25, 825.22

[56] References Cited

U.S. PATENT DOCUMENTS

| | | | |
|---|---|---|---|
| 5,289,439 | 2/1994 | Koulopoulos et al. | 369/32 |
| 5,353,016 | 10/1994 | Kurita et al. | 348/734 X |
| 5,367,316 | 11/1994 | Ikezaki | 348/734 X |
| 5,408,275 | 4/1995 | Song et al. | 348/734 |
| 5,537,106 | 7/1996 | Mitsuhasi | 340/825.25 X |

*Primary Examiner*—Mark R. Powell
*Attorney, Agent, or Firm*—Ostrolenk, Faber, Gerb & Soffen, LLP

[57] ABSTRACT

An improved operation state display apparatus and a displaying method thereof capable of displaying an operation state of an electric appliance with a shuttle switch and providing a more fashionable product by providing an improved display unit, which includes a shuttle switch for producing a certain code signal in accordance with its turn in leftward direction or rightward directions; a microprocessor for recognizing a code signal outputted from the shuttle switch, for outputting a control signal corresponding to the thusly recognized code signal, and for controlling a control object; and a display unit enabled by a control signal outputted from the microprocessor for displaying an operation state of the control object in accordance with an operation of the shuttle switch.

5 Claims, 5 Drawing Sheets

FIG. 4
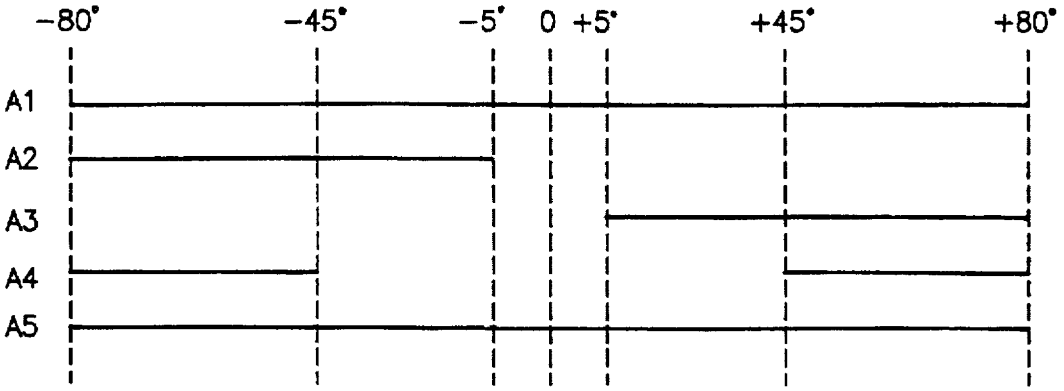
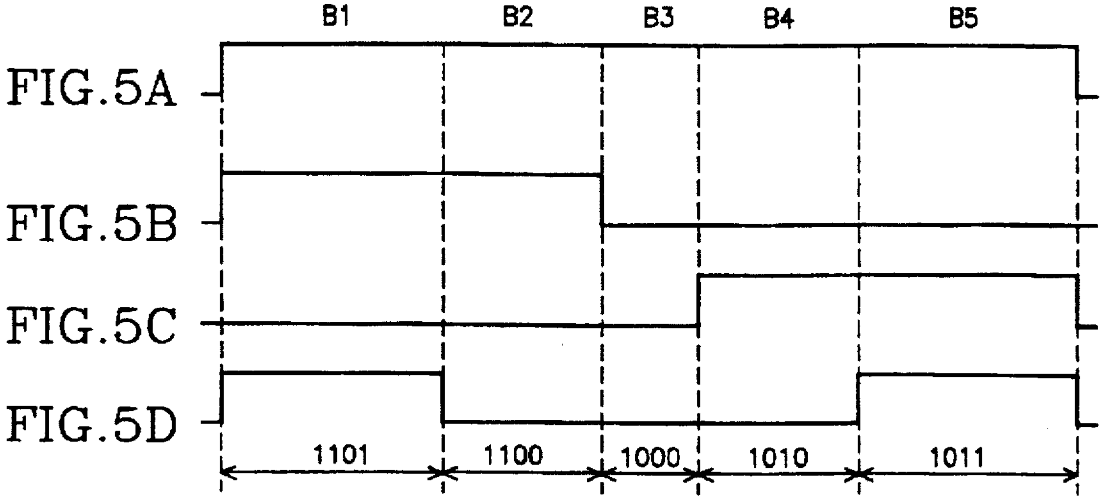

OPERATION STATE DISPLAY APPARATUS FOR SHUTTLE SWITCH AND DISPLAYING METHOD THEREOF

BACKGROUND OF THE INVENTION

1. Field of the Invention

The present invention relates to an operation state display apparatus for a shuttle switch and a displaying method thereof, and in particular to an improved operation state display apparatus for a shuttle switch and a displaying method thereof capable of displaying an operation state of an electric appliance with a shuttle switch and providing a more fashionable product by providing an improved display unit.

2. Description of the Conventional Art

Referring to FIG. 1, the conventional shuttle switch includes a shuttle switch body 1, a mode switch 2 disposed at a central portion of the body 1 for switching between a first mode and a second mode, a shuttle switch driving member 3 rotatable by a predetermined angle and engaged to an upper portion of the body 1, and an encoder 4 for producing a plurality of codes in accordance with a turn of the shuttle switch driving member 3 and for outputting the thusly produced codes to a plurality of terminals 5A through 5D. Here reference numeral 5E denotes a ground terminal.

The operation of the conventional switch will now be explained with reference to FIG. 1.

To begin with, when a user switches the mode switch 2 disposed at a central portion of the body 1 to a first mode. Thereafter, when the shuttle switch driving member 3 is turned in a leftward direction or a rightward direction by a predetermined angle, a plurality of codes are outputted from the encoder 4 in accordance with a turn of the shuttle switch driving member 3, and the thusly produced codes are outputted to the outside of the shuttle switch through the terminals 5A through 5D.

The plurality of codes outputted from the encoder 4 are recognized by a controller (not shown) of an electric appliance with a shuttle switch. The control with respect to the electric appliance is executed in accordance with a code inputted thereto.

In addition, in a state that the mode switch 2 is switched to a second mode, when the shuttle switch driving member 3 is turned in a leftward direction or a rightward direction, a certain operation may disadvantageously be controlled irrespective of the controller controlled in accordance with the first mode.

However, since the conventional shuttle switch plays only its corresponding function in accordance with a turn of the shuttle switch driving member and does not includes any display unit for displaying the control operation of the shuttle switch, it is impossible to visibly check the operation state of an electric appliance. For example, in case that the conventional shuttle switch is used for a channel change member of a television receiver, a user must check a desired channel by checking the screen of the television receiver.

SUMMARY OF THE INVENTION

Accordingly, it is an object of the present invention to provide an operation state display apparatus for a shuttle switch and a displaying method thereof, which overcome the problems encountered in the conventional operation state display apparatus for a shuttle switch and a displaying method thereof.

It is another object of the present invention to provide an improved operation state display apparatus and a displaying method thereof capable of displaying an operation state of an electric appliance with a shuttle switch and providing a more fashionable product by providing an improved display unit.

To achieve the above objects, there is provided an operation state display apparatus for a shuttle switch, which includes a shuttle switch for producing a certain code signal in accordance with its turn in leftward direction or rightward directions; a microprocessor for recognizing a code signal outputted from the shuttle switch, for outputting a control signal corresponding to the thusly recognized code signal, and for controlling a control object; and a display unit enabled by a control signal outputted from the microprocessor for displaying an operation state of the control object in accordance with an operation of the shuttle switch.

To achieve the above objects, there is provided an operation state displaying method for a shuttle switch, which includes the steps of a first step which a microprocessor recognizes a code signal outputted from a shuttle switch; a second step which the microprocessor judges a predetermined mode corresponding to the thusly recognized code signal; a third step which the microprocessor controls a control object and outputs the control signal to the display units in accordance with a corresponding mode; and a fourth step which a plurality of light emitting diodes of the display unit is turned on in order in a normal direction or in a reverse direction in accordance with a control signal outputted from the microprocessor.

BRIEF DESCRIPTION OF THE DRAWINGS

These and other objects, features and advantages of the present invention will become more apparent by the following detailed specification and drawings, in which:

FIG. 4 a view of a pattern of an encoding substrate of a shuttle switch of FIG. 2 according to the present invention.

FIG. 5A is a wave form of a signal outputted from an output terminal A1 of a shuttle switch of FIG. 2 according to the present invention.

FIG. 5B is a wave form of a signal outputted from an output terminal A2 of a shuttle switch of FIG. 2 according to the present invention.

FIG. 5C is a wave form of a signal outputted from an output terminal A3 of a shuttle switch of FIG. 2 according to the present invention.

FIG. 5D is a wave form of a signal outputted from an output terminal A4 of a shuttle switch of FIG. 2 according to the present invention.

DETAILED DESCRIPTION OF THE INVENTION

Figure 1:
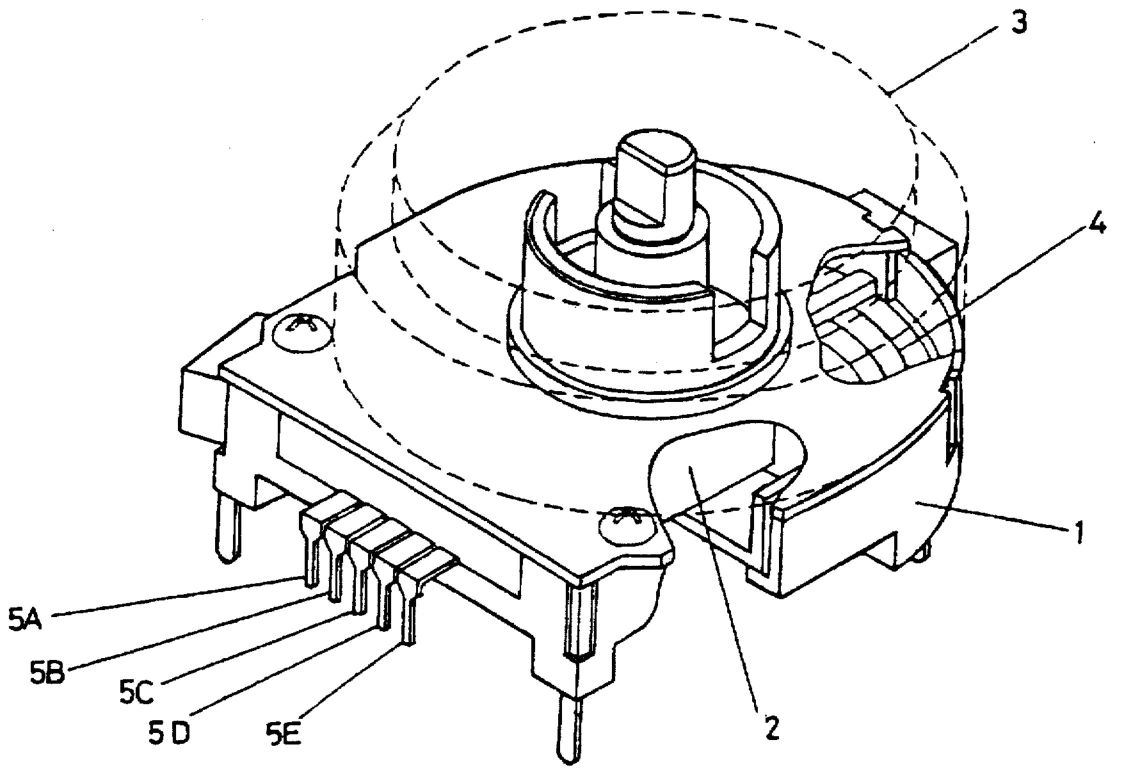
FIG. 1 CONVENTIONAL ART
FIG. 1 is a perspective view showing a conventional shuttle switch.
Figure 2:
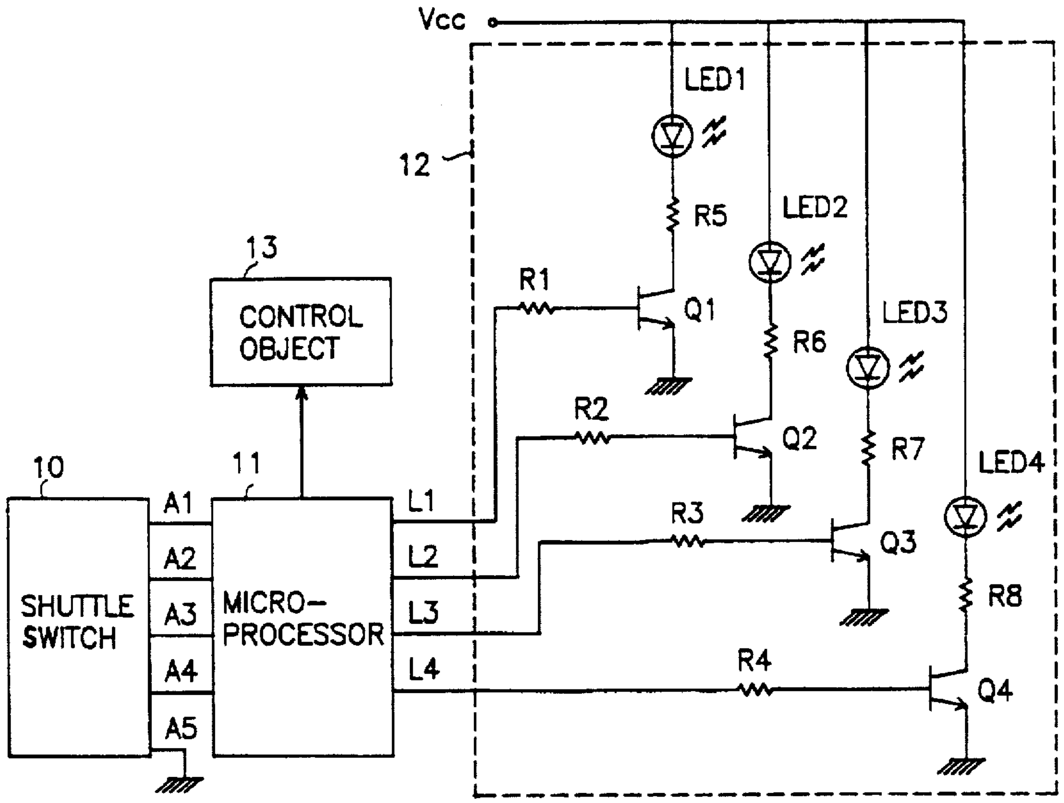
FIG. 2 is a block diagram of an operation state display apparatus for a shuttle switch according to the present invention.

Referring to FIG. 2, an operation state display apparatus for a shuttle switch includes a shuttle switch 10 for outputting a certain code signal in accordance with its leftward/rightward rotation, a microprocessor 11 for recognizing a code signal outputted from the shuttle switch 10 and for outputting a control signal corresponding to the code signal, and a display unit 12 for displaying an operation state of a control object 13 in accordance with a control signal outputted from the microprocessor 11.

In addition, the display unit 12 includes transistors Q1 through Q4 which are turned on/off in accordance with a control signal outputted from the microprocessor 11, and light emitting diodes LED1 through LED4 for receiving a power voltage Vcc and for being turned on/off in accordance with a turning on/off operation of the transistors Q1 through Q4.

Figure 3:
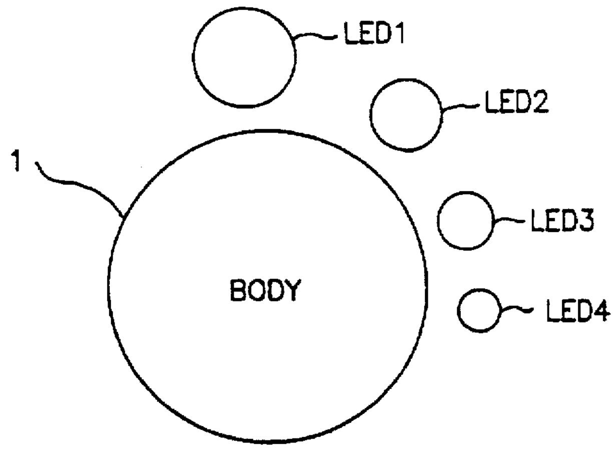
FIG. 3 is a front view showing an operation state display apparatus for a shuttle switch adopted in an electric appliance according to the present invention.

Here, the light emitting diodes LED1 through LED4, as shown in FIG. 3, are disposed at a periphery of the body 1 of the shuttle switch 10 in order.

The operation of an operation state display apparatus for a shuttle switch will now be explained with reference to accompanying drawings.

When a user turns the shuttle switch 10 in a leftward direction or a rightward direction by a predetermined angle, a certain code is generated in accordance with the turning angle of the shuttle switch 10 and is outputted to the microprocessor 11. The code outputted from the shuttle switch 10 will now be explained in more detail with reference to FIGS. 4 and 5.

To begin with, referring to FIG. 4, the pattern of the encoding substrate of the shuttle switch 10 is a type of a printed circuit board (PCB), the output terminals A1 through A4 are connected to a copper plate, and the location of the copper plate is subjected to the turning angle of the shuttle switch 10.

Therefore, the signal outputted from the output terminal A1, as shown in FIG. 5A, becomes a high level with respect to the turning angles of −80° through +80° of the shuttle switch 10. The signal outputted from the output terminal A2, as shown in FIG. 5B, becomes a high level with respect to the turning angles −80° through −5° of the shuttle switch 10 and becomes a low level with respect to the fuming angles of −5° through +80°. In addition, the signal outputted from the output terminal A3, as shown in FIG. 5C, becomes a low level with respect to the turning angles −80° through +5° of the shuttle switch 10 and becomes a high level with respect to the turning angles +5° through +80° of the shuttle switch 10. The signal outputted from the output terminal A4, as shown in FIG. 5D, becomes a high level with respect to the turning angles −80° through −45° of the shuttle switch 10, becomes a low level with respect to the turning angles −5° through +45° of the shuttle switch 10 and becomes a high level with respect to the turning angles +45° through +80° of the shuttle switch 10.

That is, for example, when a user turns the shuttle switch 10 by +5° through +45°, the output terminal A1 outputs a high level signal within a range B4 corresponding to the angles of +5° through +45°, the output terminal A2 outputs a low level signal therewithin, the output terminal A3 outputs a high level signal therewithin, and the output terminal A4 outputs a low level signal. Therefore, the thusly outputted code value is "1010."

In addition, when the user turns the shuttle switch 10 by the angles of +45° through +80°, the code value of "1011" is produced through the above-mentioned processes. In addition, when the user turns the shuttle switch 10 by the angles of −5° through −45°, the code value of "1100" is produced. In addition, when the user turns the shuttle switch 10 by the angles of −45° through −80°, the code value of "1101" is produced. The thusly produced code values am inputted to the microprocessor 11.

Thereafter, the microprocessor 11 receives a code value outputted from the output terminals A1 through A4 of the shuttle 10, judges the code values whether or not the thusly inputted code values corresponds to a certain mode, and outputs a control signal to the control object 13 and the display unit 12 in accordance with the thusly judged mode.

The microprocessor 11, as shown in FIG. 6, outputs different pulses to the transistors Q1 through Q4 through the display unit 12 so as to turn on/off the transistors Q1 through Q4. Thereafter, the light emitting diodes LED1 through LED4 each connected to the transistors Q1 through Q4 are turned on/off in order, and the user can check the operation state of the control object 13 with respect to the operation of the shuttle switch 10.

Figure 7:
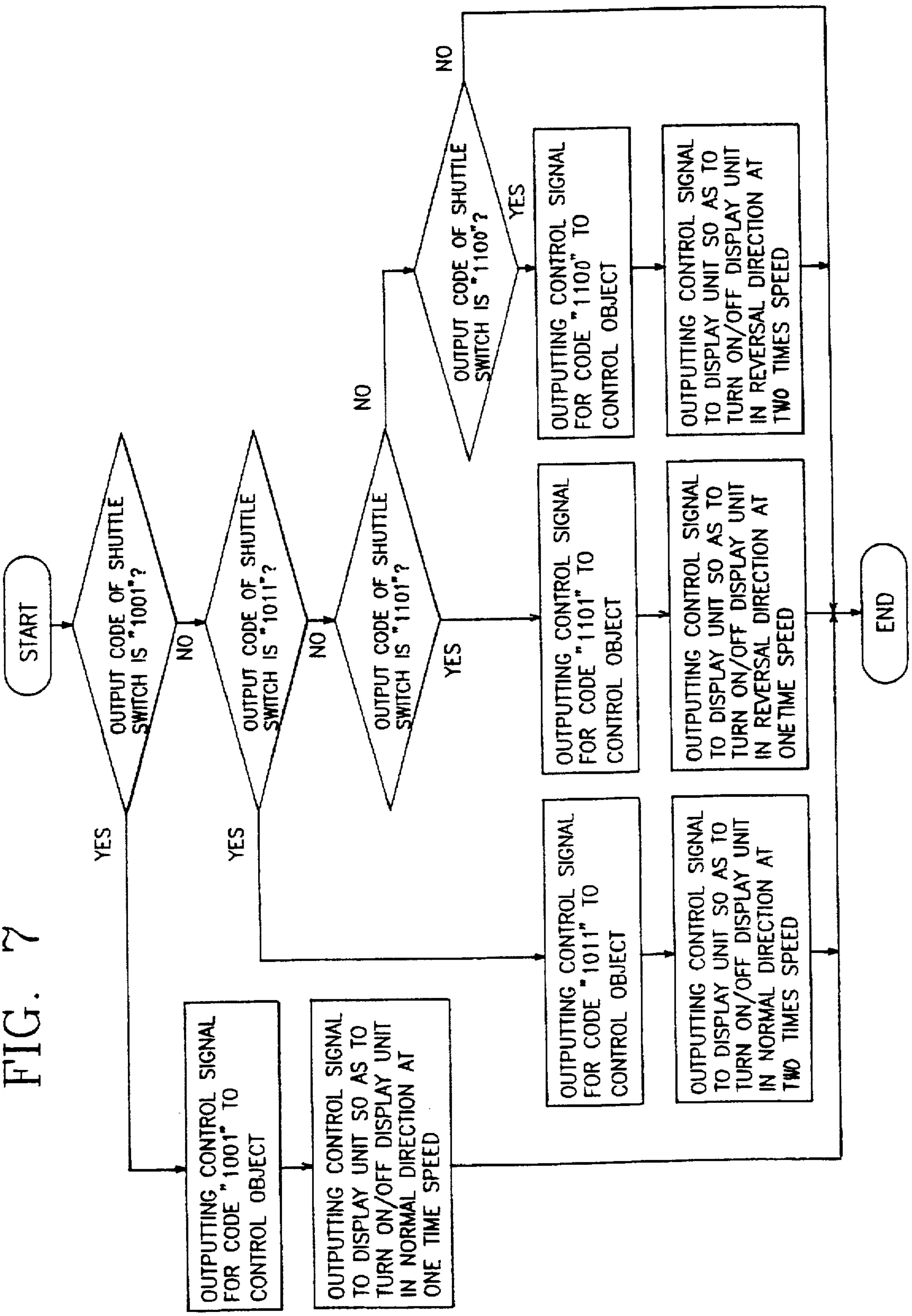
FIG. 7 is a flow chart of an operation state display method for a shuttle switch according to the present invention.

The control processes of the display unit 12 by the microprocessor 11 will be explained with reference to FIG. 7 when the operation state display apparatus for a shuffle switch and a displaying method thereof adopted in a channel control system of the television receiver.

To begin with, in this case, the control object 13 is a tuner of the television receiver. For example, in a mode-by function with respect to the output codes of the shuttle switch 10, the output code "1010" of the shuttle switch 10 can be set as a first mode so as to increase the channel by one, the output code "1011" can be set as a second mode so as to increase the channel by two times, the output code "1100" can be set as a third mode so as to decrease the channel by one, and the output còde "1101" can be set as a fourth mode so as to decrease the channel by two times.

When a code value "1010" is produced from the output terminals A1 through A4 of the shuttle switch 10 by turning the shuttle switch 10 by the angles of +5° through −45°, the microprocessor 11 recognizes the thusly generated code value "1010" as a first mode and outputs a control signal to the turner of the television receiver which is one of the control object 13.

Figure 6A:
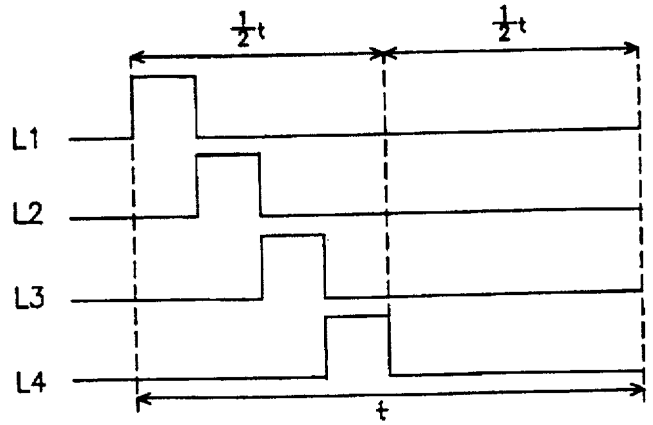
FIG. 6A is a wave form of a control signal, with respect to a first mode, outputted from output terminals L1 through L4 of a microprocessor of FIG. 2 according to the present invention.

In addition, the microprocessor 11 outputs a pulse signal having a certain phase difference as shown in FIG. 6A to the transistors Q1 through Q4 of the display unit 12 through the output terminals L1 through L4. The transistors Q1 through Q4 are turned on in order, and the light emitting diodes LED1 through LED4 are turned on from the light emitting diode LED1 to the light emitting diode LED4 in order.

Here, when assuming that time for increasing the channel by one is "t," the turning on/off completion time of the light emitting diodes LED1 through LED4 is ½t because of the automatic frequency tuning operation and a picture mute function which are necessary so as to change the channel for the remaining time of ½t.

Figure 6B:
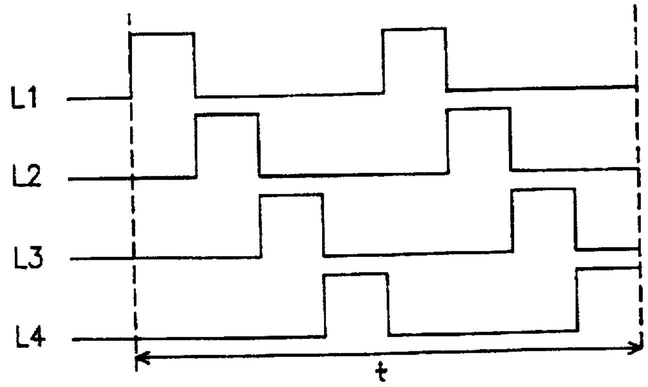
FIG. 6B is a wave form of a control signal, with respect to a second mode, outputted from output terminals L1 through LA of a microprocessor of FIG. 2 according to the present invention.

In addition, when the user turns the shuttle switch 10 by the angles of +45° through +80°, a code value "1011" is produced from the output terminals A1 through A4 of the shuttle switch 10, and microprocessor 11 judges the thusly produced code "1011" as a second mode and outputs a control signal corresponding to the code values to the tuner of the television receiver so as to increase the channel by two times. In addition, the microprocessor 11 outputs a pulse signal as shown in FIG. 6B to the transistors Q1 through Q4 through the output terminals L1 through L4, and the transistors Q1 through Q4 are turned on twice in order, and the light emitting diodes LED1 through LED4 are turned on for the time of "t" from the light emitting diode LED1 to the light emitting diode LED4 in order.

Figure 6C:
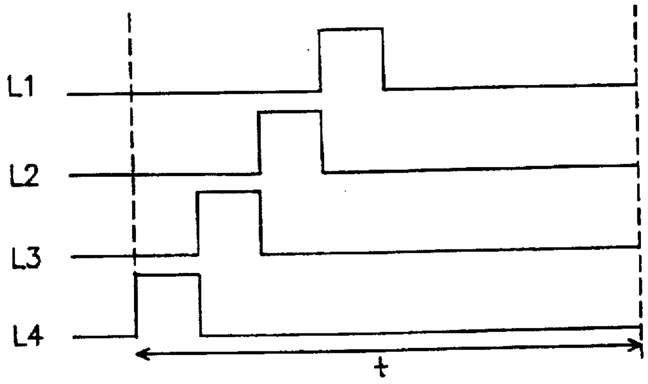
FIG. 6C is a wave form of a control signal, with respect to a third mode, outputted from output terminals L1 through L4 of a microprocessor of FIG. 2 according to the present invention.
Figure 6D:
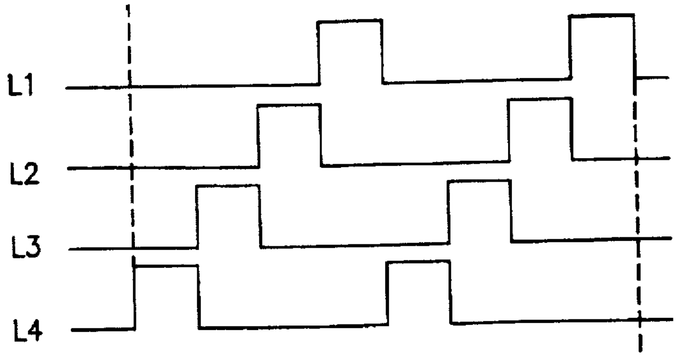
FIG. 6D is a wave form of a control signal, with respect to a fourth mode, outputted from output terminals L1 through L4 of a microprocessor of FIG. 2 according to the present invention.

When the user turns the shuttle switch 10 by the angles of −5° through −45°, the microprocessor 11 outputs a pulse signal as shown in FIG. 6C to the transistors Q1 through Q4 through the output terminals L1 through L4, and the light emitting diodes LED 1 through LED4 of the display unit 12 are turned on one time from the light emitting diode LED4 to the light emitting diode LED1 in order in the above-mentioned order.

When the user turns the shuttle switch 10 by the angles of −45° through −80°, the microprocessor 11 produces a pulse signal as diodes LED1 through LED4 are turn-emitting diodes LED1 through LED4 are turned on twice in order from the light emitting diode LED4 to the light emitting diode LED1.

Here, after the user turns the shuttle switch 10 by a predetermined angle, when the user does not turn back to its original position, the microprocessor 10 outputs a certain pulse signal, and the light emitting diodes LED1 through LED4 are turned on in accordance with a corresponding mode.

As described above, the operation state display apparatus for a shuttle switch and a displaying method thereof is directed to turning on the light emitting diodes in order from a first light emitting diode to a fourth light emitting diode when a predetermined channel is changed by a user, so that the user can easily check the change of the channel in accordance with the light state of the light emitting diodes. In addition, the present invention is directed to providing a more fashionable product by providing an improved display unit.

What is claimed is:

1. An operation state display apparatus for a shuttle switch, comprising:
   - a shuttle switch for producing predetermined code signals in accordance with the turning of the shuttle switch in leftward and rightward directions;
   - a microprocessor for recognizing the predetermined code signals outputted from said shuttle switch, for outputting a control signal corresponding to the recognized code signals, and for controlling a control object; and
   - display means responsive to the control signal outputted from said microprocessor for displaying an operational state of said control object in accordance with an operational state of the shuttle switch.

2. The apparatus of claim 1, wherein said display means includes:
   - a plurality of transistors turned on/off in accordance with a control signal outputted from the microprocessor; and
   - a plurality of light emitting diodes connected to said plurality of transistors and turned on/off in accordance with an operation of the transistors.

3. The apparatus of claim 2, wherein said plurality of light emitting diodes are disposed at a periphery of the body of the shuttle switch in order and turned on/off in order in a normal direction or in a reverse direction once or a predetermined times.

4. An operation state displaying method for a shuttle switch, comprising the steps of:
   - a first step which a microprocessor recognizes a code signal outputted from a shuttle switch;
   - a second step which said microprocessor judges a predetermined mode corresponding to the thusly recognized code signal;
   - a third step which the microprocessor controls a control object and outputs said control signal to display means in accordance with a corresponding mode; and
   - a fourth step which a plurality of light emitting diodes of said display means is turned on in order in a normal direction or in a reverse direction in accordance with a control signal outputted from the microprocessor.

5. The method of claim 4, wherein said control signal is a plurality of signals outputted for a predetermined time.

* * * * *